United States Patent Office 2,858,903
Patented Nov. 4, 1958

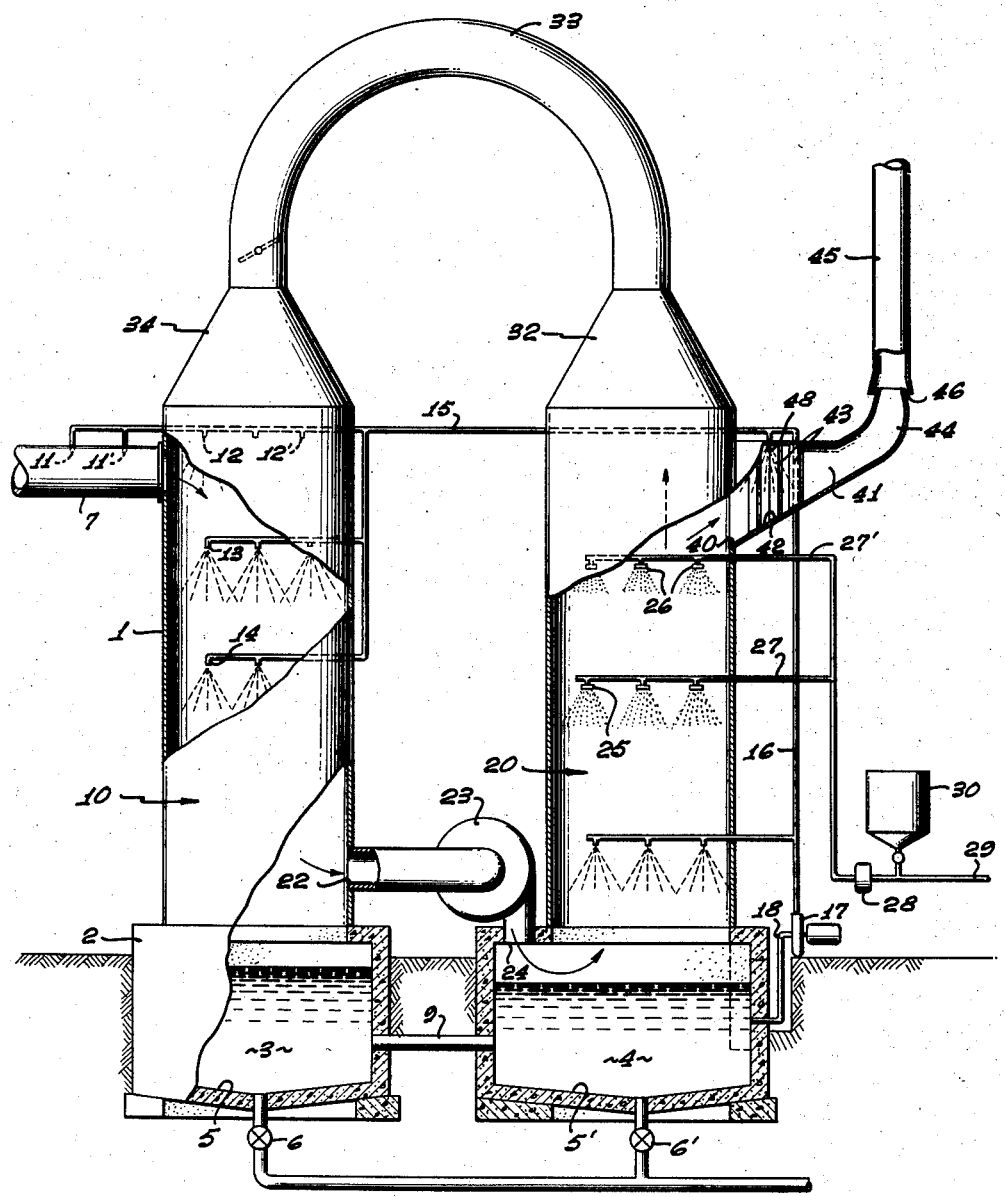

2,858,903

METHODS FOR THE TREATMENT OF INDUSTRIAL AEROSOLS

Alexander Goetz, Altadena, and Horace Edmund Karig, Pasadena, Calif., assignors to Madeleine Fallon, Los Angeles, Calif.

Application January 11, 1955, Serial No. 481,206

9 Claims. (Cl. 183—121)

This invention relates to the treatment of industrial gases containing suspended particulate matter, such gases being generally referred to as aerosols, the particulate matter consisting of extremely fine solid and liquid particles in suspension. These gas-borne particles may be said to consist of smokes, fogs and fumes of both organic and inorganic components. Industrial aerosols of this type are generated during many manufacturing, refining, smelting and other industrial operations, are discharged in tremendous volumes into the air, contaminate the atmosphere, materially contribute to the formation of atmospheric conditions recently termed "smog," exert a detrimental effect upon public health, retard plant growth, damage crops and exert other undesirable effects.

The present invention is directed to the treatment of such industrial aerosols for the efficient removal of particulate matter therefrom. The invention relates to novel methods of procedure, to the development of conditions wherein coalescence or flocculation of the particulate matter is expedited, to the disclosure of methods, means and conditions whereby the particulate matter is absorbed most effectively in liquid media and wherein electric forces on the surfaces and within the particulate matter and droplets of liquid media are employed in new manners for the attainment of the desired results.

The apparatus used to carry out the process of the present invention, although relatively small and compact, is capable of treating large volumes of gases, subject the gases to repeated contact with droplets of a liquid medium, thereby providing a relatively long contact time, a high concentration of droplets conducive to maximum incidence of collision and the existence of relative velocities between the particulate matter and the droplets, thereby most effectively removing extremely small particulate matter, eight microns and less in mean dimension, from such gases.

The use of scrubbing towers, bubble towers, and other forms of equipment in which sprays, pools or waterfalls of water have been used in an attempt to remove particulate matter from industrial gases has been described heretofore. Such sprays and bubble towers are capable of wetting and removing from a gas solid particles which are readily wetted with water and which are of appreciable size, i. e., of a diameter exceeding 10–20 microns, depending upon the mass and chemical nature of the particle. Such relatively large particles may also be removed from industrial gases by electrostatic means, cyclones, bag filters, and the like. Because of their size these relatively large particles are subject to gravitational sedimentation and do not form the persistent, relatively stable fogs, smokes and smogs which plague industrial areas and deleteriously affect the health and well being of the population. The most damaging constituents of industrial aerosols comprise the particulate matter which is smaller than ten microns in size and which, in most instances, is substantially colloidal in size and characteristics in that the particles have a mean dimension of less than 5 microns and are capable of forming relatively stable fogs and smokes. These finer particulate matters are often of organic composition, consisting of carbon, minute condensates allied to ketones, hydrocarbons, alcohols, ammonia compounds, sulfur compounds, and the like. The removal of these extremely fine particles and vapors has not been successfully accomplished heretofore by scrubbers, electrostatic precipitators, etc., but the methods, materials, conditions and procedures hereinafter disclosed appear to solve the problem.

It is an object of the present invention, therefore, to disclose and provide a process of treating industrial aerosols containing appreciable quantities of particulate matter smaller than eight microns for the removal of such matter therefrom.

A further object of the invention is to disclose and provide methods of treating industrial aerosols whereby the gas containing extremely fine particulate matter is adiabatically expanded so as to condense water vapor present upon nuclei composed of such particulate matter, thereby facilitating the removal of such matter from the gas.

Another object of the invention is to disclose and provide a process of treating industrial aerosols with a fog of dipolar droplets having a potential difference between dipoles, such dipolar droplets exerting in transit an unexpected attraction upon particles, irrespective of the charge carried thereby.

Moreover, an object of the present invention is to disclose and provide methods and conditions whereby the electrokinetic energy potentials of liquid droplets are increased, thereby facilitating the approach of particulate matter to within range of the van der Waal's attractive forces, with resulting contact, adherence, coalescence of particle and droplet and subsequent removal from the gas.

These and various other objects, advantages, modifications and aspects of the invention will become apparent to those skilled in the art from the following description. In order to facilitate understanding and crystallize the concepts herein disclosed, reference will be had to the appended drawing which illustrates, in a somewhat diagrammatic manner, one form of apparatus in which the methods of the invention may be carried out. It is to be understood, however, that the methods of the invention may be applied in various other forms of equipment and not all of the steps and materials described hereafter need be used concurrently.

The appended diagram illustrates a form of apparatus particularly adapted for the treatment of waste gases from a cupola, smelter or other operation resulting in waste gases at a temperature of above 800°–1000° F. As there shown the apparatus comprises a primary stage generally indicated at 10 and a secondary stage generally indicated at 20. The primary stage 10 may comprise a vertical, cylindrical housing 1 mounted upon a suitable base 2 in the form of a tank which will be hereafter referred to as the primary settling tank 3. The base 2 may continue beneath the secondary stage 20 and form a recirculation tank 4 therebeneath. Both the primary settling tank 3 and the recirculation tank 4 may be provided with downwardly sloping bottoms 5 and 5' provided with valved drain outlets 6 and 6' respectively.

The primary stage 10 may be provided with a gas intake conduit 7 in communication with the furnaces, cupolas, stacks or other source generating the industrial waste gas. Positioned within the gas intake conduit 7 adjacent the vertical body 1 of the primary stage 10, spray heads 11 and 11' may be provided. Additional downwardly directed spray nozzles may be positioned near the top of the primary stage 10 as indicated at 12 and 12' and additional downwardly directed spray nozzles 13 and 14 may be positioned within the vertical body 1 of the primary stage. These various spray heads and nozzles may be supplied by suitable pipelines, such as 15 and 16, connected with the discharge port of a recirculation pump 17, the intake of such pump being connected by line 18 to the recirculation tank 4. Mounted upon the base 2 and over the recirculation tank 4 is the secondary stage 20 having the vertical, cylindrical body portion 21.

The lower portion of the primary stage 10 is provided with a gas outlet 22 leading to a suitable blower 23 which discharges through port 24 into the bottom portion of the secondary stage 20. Positioned within the central and upper portion of the secondary stage 20 are downwardly directed fog nozzles 25 and 26 supplied with a suitable mixture of liquids by lines 27 and 27' leading to pump 28 supplied with water by line 29 and a polar liquid from reservoir 30.

The top of the secondary stage 20 is preferably provided with an inwardly tapering hood or converging nozzle 32 communicating with a conduit or return line 33 of restricted cross section, such conduit 33 being connected to the top of the primary stage 10 by means of an expanding nozzle section and conduit 34.

It is to be understood that the apparatus described to this point is substantially gas-tight, heated industrial waste gases being supplied by conduit 7 to the top of the primary stage, passing downwardly in such stage in substantially concurrent flow with spray from the various nozzles 11, 12, 13 and 14, and then being discharged from the bottom of the primary stage through port 22 and blower 23 into the bottom of the secondary stage through port 24. The gases then pass upwardly in the secondary stage in counterflow relation to the downwardly directed droplets discharged by the fog nozzles 25 and 26, the gas then recirculating through converging nozzle 32, throat 33 and expanding nozzle 34 into the top of the primary stage.

Adjacent the top of the secondary stage 20 is a discharge port 40 leading into a chamber 41 provided with a floor 42 inclined downwardly toward the interior of the secondary stage 20. Positioned within the chamber 41 are suitable interceptor means 43. The chamber 41 discharges through an upwardly directed conduit 44 into an exhaust stack 45. A series of ports 46 may surround the end of discharge conduit 44 at the base of the stack 45 for the purpose of admitting cooling air and diluting the discharged gases to disperse steam or water vapor in the induced air before gases are discharged to atmosphere.

In the operation of the equipment a certain proportion of the gas within the apparatus is constantly discharged through chamber 41, duct 44 and stack 45, the remainder being recirculated as previously stated. The proportion of gas recirculated may be reduced by suitable flow control means, such as the damper 35 positioned at the end of the restricted throat 33. It may be noted at this point that during operation a relatively low pressure is maintained in the primary stage 10 and a higher pressure is maintained in the secondary stage 20, this difference in pressures being indicated in the difference in levels of liquid in settling tank 3 and recirculation tank 4, these two tanks being in communication with each other by means of the port or conduit 9.

The performance of the methods embraced by the present invention contemplates the formation of minute droplets by the fog nozzles 25 and 26 from a mixture of polar liquid and water in intimate dispersion or in the form of a typical lyophobic or quick breaking, non-foaming emulsion. Mixture of water from supply line 29 and of a polar liquid from supply tank 30 may take place in pump 28, proper proportions between water and polar liquid supplied to such pump being controlled by valves in the respective supply lines, or by the use of orifice plates. The polar liquid employed may be an animal or vegetable oil, a ketone ester or amide and preferably contains a polar group. The polar liquid employed must be immiscible with water and should have a sufficiently high boiling point and a low vapor pressure at the boiling point of water to prevent loss by evaporation when hot gases are being treated. The last requirement restricts the use of alcohols, amines and nitriles in most instances. Vegetable oils such as cottonseed oil, olive oil, castor oil and other unsaturated hydrocarbons of strongly polar nature are eminently suited for use in the process. The use of detergents or emulsifiers which may cause foaming is to be avoided, although the water may contain salt or a halide.

The emulsion supplied by pump 28 and line 27 to the fog nozzles 25 and 26 need not be stable. The ratio of water to polar liquid in such emulsion may vary between wide limits, such limits being influenced by the temperatures of the gas supplied to the bottom of the secondary stage 20. In actual practice, the minute droplets of liquid formed by the fog nozzles need not contain more than one part of oil to three to ten parts of water, but when relatively hot gases are being treated, the pump 28 may discharge into line 27 an emulsion containing 60 to 120 parts of water to one part of oil, the excessive amounts of water being vaporized after being discharged into the gas stream so as to produce effective droplets containing but three to twenty parts of water to one of oil.

The method of the present invention contemplates the production of a fog of dipolar droplets having a high potential difference between dipoles. In order to attain the best results, it has been found desirable to employ efficient fog nozzles and to supply the emulsion to such fog nozzles at considerable pressure, the shearing stresses applied to the liquid mixture at the nozzles generating a higher charge on the dipolar droplets. Moreover, such droplets should preferably be of minute size and not exceed 100 microns in mean diameter, since it has been found that minute droplets of 6–10–20 microns in mean diameter carry an electrokinetic potential of enhanced effectiveness. A decrease of average droplet diameter from 100 microns to 33 microns causes an increase of almost 30 times in droplet number, i. e., in points of potential particle attraction within the gas volume. The smallest droplet diameter generated is limited only by the economics of the energy requirement for generating them.

The method of operation utilized in the continuous treatment of hot industrial aerosols comprising gases having a temperature in excess of 800° F., such gases containing an appreciable quantity of particulate matter smaller than eight microns in mean diameter, may be said to involve the following steps: Such hot industrial aerosols are introduced into the apparatus by intake conduit 7. Within the primary stage 10 such gases are partially cooled and partially or wholly saturated by means of the downwardly directed sprays 11, 12, 13 and 14. The partially cooled gas is then discharged by blower 23 into the bottom of the secondary stage 20. Blower 23 may be operated at constant speed but preferably has a capacity of two to four times the capacity of outlet 40 and chamber 41 so that the secondary stage is maintained at a higher pressure than the primary stage 10; in actual operation, a pressure of four to ten inches of water may be maintained in the secondary stage. The partially cooled gases move upwardly at relatively high velocity into contact with the downwardly directed fog of minute dipolar droplets. Although the gases have been partially humidified in the primary stage, they are humidified to substantially saturation and their temperature is reduced to virtually the dew point in the secondary stage, a portion of the water contained in each of the minute dipolar droplets being evaporated in the process. Such evaporation increases the content of the polar liquid in each of the droplets.

It has been found that contact and collision of particulate matter with the dipolar droplets is enhanced when the gas is substantially saturated with moisture. Each droplet, which after evaporation of a fraction of its water component (necessary for moisture equilibrium with its aerosol environment) will thus consist of water and of oil and it has to be assumed for thermodynamic reasons that such a distribution of both components will be attained wherein the interface water-oil is a minimum. The surface of the droplet will thus consist of oil in one part and water in another, so that a dipole is generated capable of attracting particles of opposite charge, consequently effectively increasing the probability of coalescence with such particles. Since the ultimate coalescence between particles and droplets is not only dependent upon the sign of the surface charges but also upon the mutual ability of being wetted, the amphoteric nature of the emulsion droplet assures the permanent incorporation of hydrophilic as well as oleophilic particles, such as silica and soot, respectively. Furthermore, when the electrokinetic energy potentials of the dipolar droplets have been increased, as previously stated, the approach of particulate matter to within range of attractive forces of the dipoles is facilitated. Collision is thus virtually insured and the dipole particles have the ability to attract, wet, and absorb hydrophilic and oleophilic particles of matter. Moreover, since, as previously indicated, the most effective size of the dipole droplets appears to be less than about 20 microns in mean diameter, such droplets have a minor mass effect and their charges appear to be effective for a remarkably great distance from the surface of such droplets, permitting the minute particulate matter to come within range of attraction and be absorbed by the droplet.

Not all of the particulate matter carried by the gas will be absorbed by the dipolar droplets by one passage of the gas through the secondary stage 20. In order to effectively remove substantially all of the particulate matter, the gas is recirculated, in part at least, through the restricted throat 33 back into the primary stage 10. Recirculation is caused by the excessive volumetric capacity of blower 23, mentioned previously, with respect to outlet capacity at standard pressure conditions. Such recirculation is of considerable importance in that the gas discharged from throat 33 into the primary stage 10 is adiabatically expanded as it passes through the expanding nozzle 34 into the body of the primary stage (maintained at a lower pressure) and during such expansion moisture contained in such gas is condensed, in part at least, condensation preferentially taking place around the particulate matter as nuclei. The shell of adsorbed liquid formed on the particles of matter and the forces in such strongly bound layer of adsorbed liquid are contributing factors which facilitate the flocculation and agglomeration of the particles. In accordance with the method of this invention, the unbalance of forces on the surfaces of particulate matter is more readily attained when substantially saturated conditions exist in the gas, the influence and attraction between the particles being greater under such conditions.

The agglomerated and flocculated particles are therefore scrubbed from the gas with greater facility and efficiency by the sprays 12, 13 and 14. It will therefore be seen that these sprays not only reduce the temperature and tend to humidify the fresh incoming gas, but also remove coarse particulate matter and carry down the particles upon which moisture has been condensed and which have become susceptible to agglomeration and flocculation. The material collected in the primary settling tank 3 therefore comprises water, polar liquid and particulate matter.

A volume of gas equal to the volume of gas fed into the apparatus through supply line 7 (corrected for temperature and pressure) is constantly removed through outlet 40, chamber 41 and stack 45. Chamber 41 includes suitable interceptor baffles, screens and the like upon which suspended dipolar droplets are caught. These dipolar droplets will be found to contain large quantities of extremely fine particles of solid, tarry and other matter and may be washed from the interceptor baffles by means of a spray 48, the coalesced droplets and wash water together with contained or absorbed particulate matter being washed down into the recirculation tank 4. It will be found that the vast majority of the oil, loaded with particulate matter, will settle to the bottom in the primary settling tank and the recirculation tank 4 and can be periodically withdrawn therefrom by valved outlets 6 and 6': supernatant liquid will be preponderantly aqueous. The breaking up of the dipole emulsion droplets in tank 4 results in a scrubbing of the continuous water phase by the oily droplets.

The apparatus described herein eliminates the necessity of using long, horizontally arranged scrubbers and the use of large pump capacity in order to provide the necessary spray density. In the present invention the recirculation of a large proportion of the gas stream passing through the blower and the secondary high pressure stage in effect provides a fluid flywheel whereby the great majority of the gases are scrubbed several times in both the primary and secondary stages without the necessity for pumping an excessive volume of scrubbing fluid. This recirculation increases the effective sojourn of the gases in the chambers providing adequate contact time with the dipole droplets even though the chambers are of relatively short length. The recirculation of a large part of the gas stream from the secondary chamber into the primary chamber provides an automatic means for the control of the volume of gases entering the scrubber system. With an increase in volume of input gases, the flow through the recirculation passage 33 is reduced, and essentially a constant volume of gases is circulated through the blower and both of the stages. This eliminates the need for careful manual or automatic dampers to compensate for variable flow of input gases.

As previously indicated, the droplets introduced into the secondary stage should be small so as to present a high ratio of surface area to total mass of the polar-nonpolar mixture from which they are made. The production of dipolar droplets having a mean diameter of 100 microns or less can be attained by the use of suitable pump pressures and proper design of nozzles. Compressed air may be used in the nozzles to facilitate the formation of a fine fog. It is desirable that the mixture of polar liquid and water supplied to the nozzles contain more than fifty parts of water to one of polar liquid; the quantity of fog so introduced may be correlated to the temperature of the gases entering the secondary stage so as to evaporate a portion of the water in said droplets and reduce the water content to below about fifteen parts of water to one of polar liquid. Such evaporation appears to reduce the size of the droplets to below about 20 microns, increases the total area per pound of droplets and greatly facilitates the attraction and entry of particulate matter having negative and positive polarity into such small dipolar droplets.

The interceptor means 43 need not be within the chamber or conduit 41; the port 40 leading from the upper portion of the secondary stage 20 may lead to any suitable type of device or arrangement adapted to remove the droplets and the particulate matter carried thereby from the gas stream. Moreover, although fresh water is preferably introduced into the system through line 29, in order to insure proper operation of the fog nozzles and preclude clogging with impurities, it is to be understood that the resulting dipolar droplets absorb water-soluble or water-wettable particles and therefore such dipolar droplets are rapidly converted into those composed of an intimate mixture of polar liquid and an aqueous medium; the droplets assume the properties of a dipole, i. e., of a particle carrying opposite charges at its opposite ends. The presence of saline material or halides in solution in the aqueous liquid forming a part of the dipole droplets appears, in fact, to increase the ability of the dipole droplets to remove finer or smaller particulate matter.

One specific form of apparatus similar to that described herein has been successfully employed in the removal of very fine particulate matter from smoke and gases discharged from a cupola operation. In such specific example the first and second stages consisted of housings approximately 3' x 5' in section and 15' high. Gas was admitted to the first stage at a rate of from about 6000 to 7000 cubic feet per minute at 1700° F. The pressure in the first stage was maintained at about 1 inch $H_2O$ below atmospheric pressure and in the second at about 5 inches of water above atmosphere. Blower capacity was 15,000 cubic feet per minute. The fog nozzles were supplied with an intimate mixture of castor oil and water, one pound of oil being used per 100 pounds of water, 1000 pounds of such mixture being used per hour. The cross section of the return conduit was 3 square feet in area. Approximately 20–30 lbs. of solids were removed from the gases per hour, this constituting 85% to 95% of total solids emitted. Although the specific example given hereinabove related to treatment of hot industrial gases (and in most instances the gases to be treated are at temperatures above 500°–800° F.) the invention is not limited thereto since a gas at any temperature containing particulate matter may be effectively treated by the use of the dipole droplets and both solid and vaporous contaminants effectively removed therefrom, whether such contaminants are hydrophobic or hydrophilic in character.

We claim:

1. In a method of treating industrial gases to remove particulate matter therefrom, the steps of: preforming an emulsion comprising one part of water-immiscible polar liquid and 50 to 120 parts of water; converting said emulsion to a fog of fine droplets by the application of shearing stresses whereby substantially all of the droplets are dipolar, one pole consisting of a body of water and the other pole consisting of a separate body of polar liquid in contact with said body of water, said poles being electrically and oppositely charged, whereby each droplet has enhanced effectiveness in attracting particulate matter; and mixing said fog of charged dipolar droplets with said industrial gas, whereby particulate matter is attracted to and held by said droplets.

2. The method set forth in claim 1 which includes the further step of removing from said gas said droplets and the particulate matter held thereby.

3. A process of treating relatively hot industrial aerosols comprising gases containing appreciable quantities of particulate matter smaller than eight microns for the removal of such particulate matter, comprising: cooling and humidifying such aerosols by contact with cooling water sprays in a primary cooling and humidified zone; passing said cooled and substantially water-saturated, humidified gas and particulate matter suspended therein into a secondary contact zone; preforming an emulsion comprising one part of a water-immiscible polar liquid and 50 to 120 parts of water; applying shearing stress to said emulsion to convert the same to a fog consisting substantially entirely of dipolar droplets; and introducing said fog of dipolar droplets into said secondary contact zone, each of said dipolar droplets having one pole consisting of a body of water and another pole consisting of a separate body of polar liquid in contact with said body of water, said poles being electrically and oppositely charged, whereby particulate matter of positive and of negative polarity is attracted to and enters said dipolar droplets.

4. The process set forth in claim 3 which includes the further steps of returning one portion of said gas and droplets to the primary cooling and humidifying zone; and discharging another portion of said gas and droplets into an interceptor zone and there removing the dipolar droplets with contained particulate matter from the cooled gas.

5. The process set forth in claim 4 which includes the step of decreasing the size of said dipolar droplets in said secondary contact zone by partial evaporation of the water body constituents of said droplets with concurrent humidification of the gas to substantial saturation.

6. The process set forth in claim 4 wherein the pressure of the cooled gas from the primary zone is increased as it is passed into said secondary zone.

7. The process set forth in claim 6 wherein said one portion of said gas is adiabatically expanded as it is returned to said primary zone.

8. The process set forth in claim 7 which includes the step of decreasing the size of said dipolar droplets in said secondary contact zone by partial evaporation of the water body constituents of said droplets with concurrent humidification of the gas to substantial saturation.

9. In a method of treating industrial gases to remove particulate matter therefrom, the steps of: preforming an emulsion comprising one part of water-immiscible polar liquid and 50 to 120 parts of water; converting said emulsion to a fog of fine droplets by the application of shearing stresses whereby substantially all of the droplets are dipolar, one pole consisting of a body of water and the other pole consisting of a separate body of polar liquid in contact with said body of water, said poles being electrically and oppositely charged, whereby each droplet has enhanced effectiveness in attracting particulate matter; mixing said fog of charged dipolar droplets with said industrial gas, whereby particulate matter is attracted to and held by said droplets; separating said droplets from said gas and collecting them in a pool of water; and collecting the particulate matter by allowing said droplets to settle to the bottom of said pool, said settling resulting from the increased density imparted to said droplets by the particulate matter held thereby.

References Cited in the file of this patent

UNITED STATES PATENTS

| 1,620,826 | Mitchell | Mar. 15, 1927 |
| 1,673,732 | Brooks | June 12, 1928 |
| 1,928,702 | O'Mara | Oct. 3, 1933 |
| 2,077,996 | Hall | Apr. 20, 1937 |
| 2,207,576 | Brown | July 9, 1940 |
| 2,259,032 | Fisher | Oct. 14, 1941 |

FOREIGN PATENTS

| 102,460 | Australia | Nov. 8, 1937 |